UNITED STATES PATENT OFFICE.

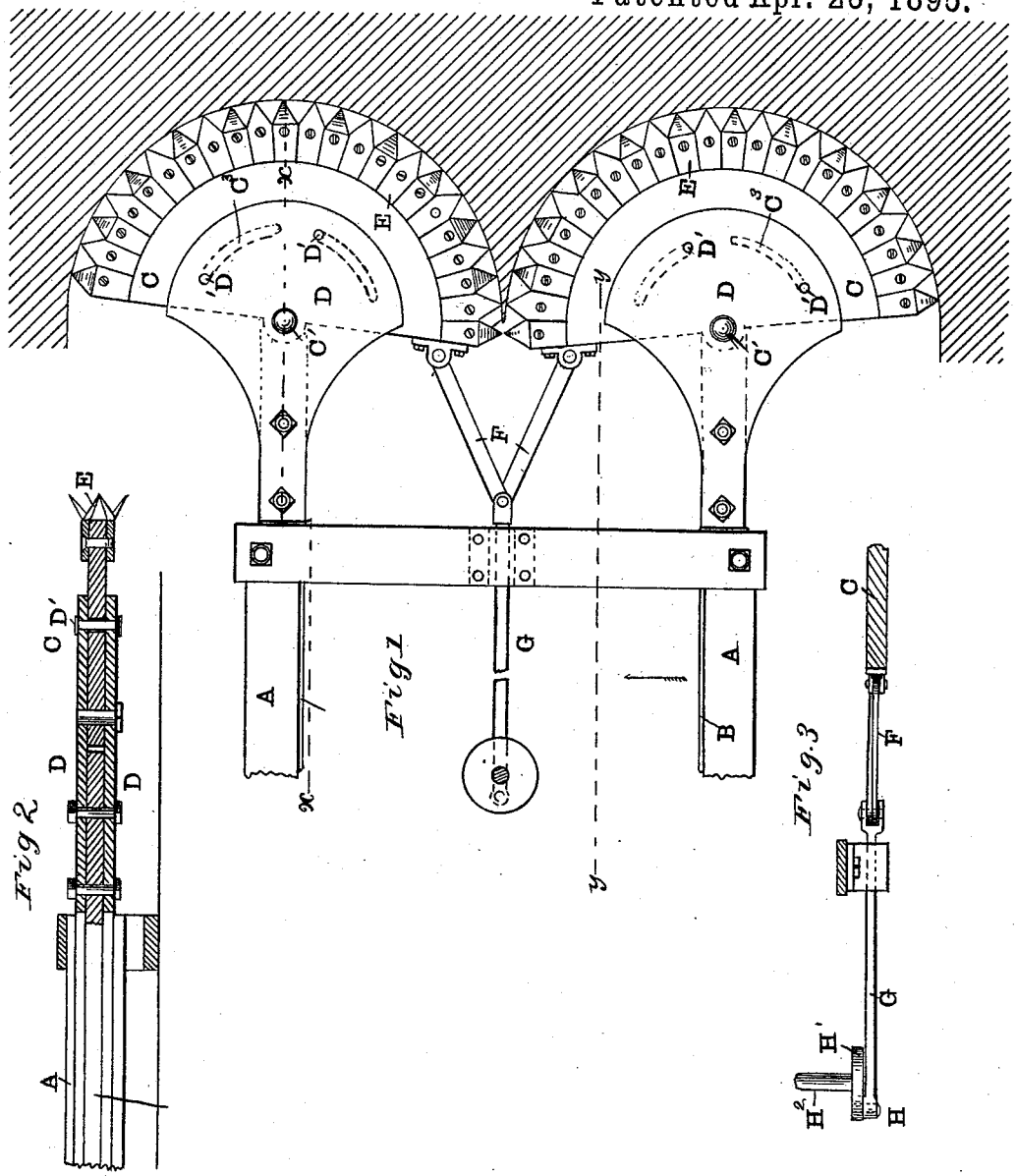

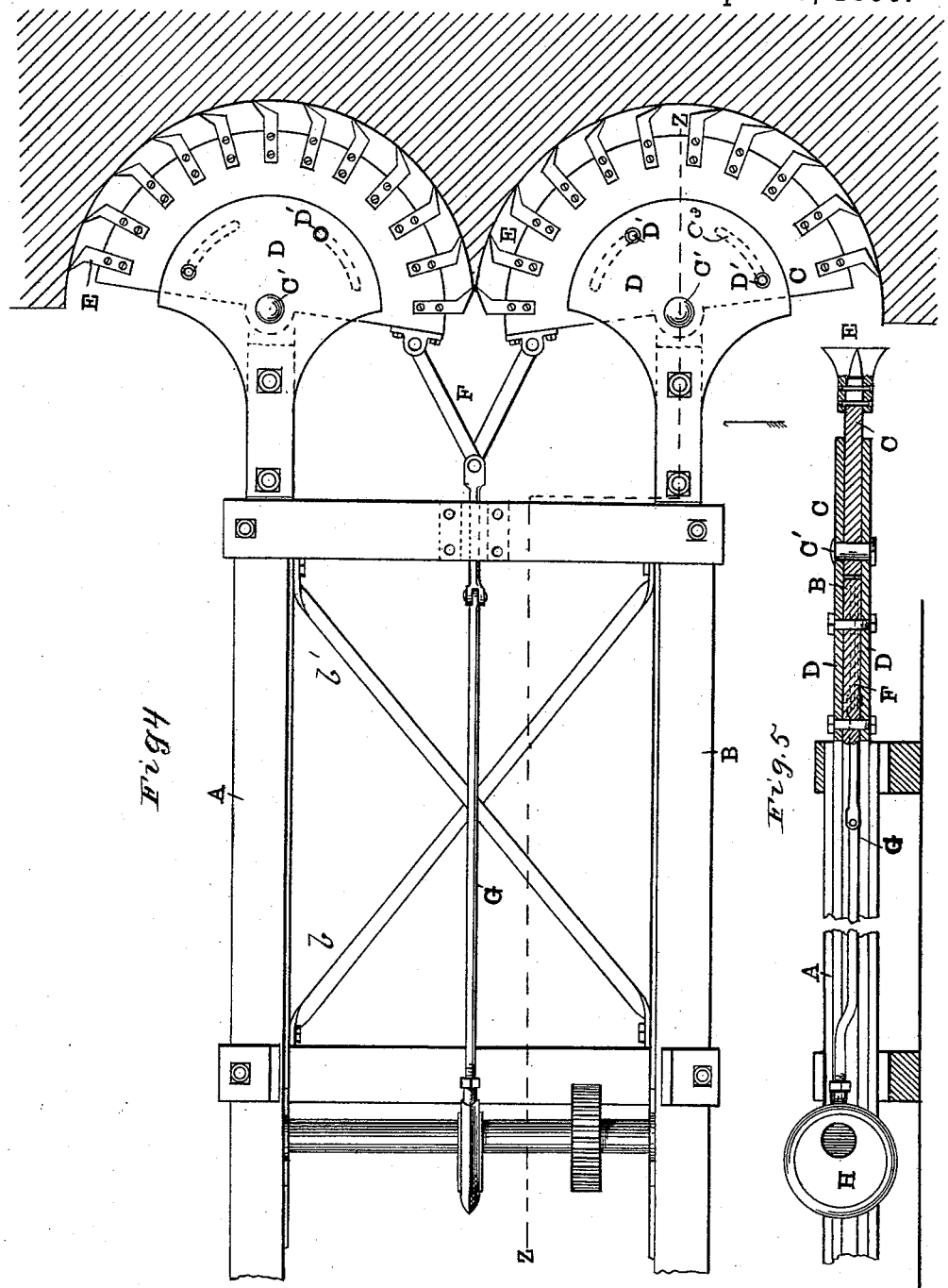

HENRY B. DIERDORFF, OF COLUMBUS, OHIO, ASSIGNOR TO JOSEPH A. JEFFREY, OF SAME PLACE.

MINING-MACHINE.

SPECIFICATION forming part of Letters Patent No. 538,210, dated April 23, 1895.

Application filed July 17, 1886. Serial No. 208,297. (No model.)

*To all whom it may concern:*

Be it known that I, HENRY B. DIERDORFF, a citizen of the United States, residing at Columbus, in the county of Franklin and State of Ohio, have invented certain new and useful Improvements in Mining-Machines, of which the following is a specification, reference being had therein to the accompanying drawings.

My invention relates to an improvement in mining machines of the class having reciprocating carriers provided with cutters so arranged as to produce a kerf into which can pass the cutters, the carriers and a carriage together with braces and power transmitting parts, &c.

Figure 1 is a plan view of a portion of a machine embodying my improvements. Fig. 2 is a section on the line $x$—$x$, Fig. 1. Fig. 3 is a section on the line $y$—$y$, Fig. 1. Fig. 4 is a plan view of a modified form of the machine. Fig. 5 is a section on line $z$—$z$, Fig. 4.

Heretofore the machines more or less analogous to the present one have had a construction of parts of one or another of the following sorts.

First. Use has been made of a rotating bar provided with radially projecting cutters whereby a kerf could be produced from three to six inches deep. Some of these machines have each had the cutter bar mounted transversely across the front end of a carriage which slides on a stationary bed in conjunction with a driving chain engaging with said bar, the latter being adapted to have both ends advanced together directly into the face of the coal; and have each had the cutter bar projecting laterally from the machine and supported at one end only, the attempt having been made to advance the bar on lines parallel to the face. Serious difficulties are incident to machines of both these types, so that those having laterally projecting cutter bars, the side thrust or strain (especially when a bar is used long enough, say six feet long, to make an available cut) and the springing and twisting are so severe that such machines have never been successfully used. With those having a cutter bar, advanced parallel to the face of the coal and supported at both ends in carriage bearings, it is difficult to apply power without great loss, as it must be done by chains working on a small radius. Both these forms of machines have a common difficulty which is incident to the fact that all of the cutters move in one direction and therefore the cutter bar and its adjacent parts tend to move bodily in the opposite direction; that is if the cutters engage with the coal when they move down, the cutter bar tends to move up, and vice-versa; and this tendency results in a serious and often disastrous binding of the parts.

Second. Use has been made of machines in each of which there was a reciprocating cutter carrier working in a manner more or less analogous to a saw. In some this reciprocating saw was mounted at the front end of the carriage so as to be thrust into the coal on a path of advance perpendicular to the face; and in others it was extended out laterally from a carriage. To these also has been added the serious difficulty incident to reactionary thrust, being here experienced on horizontal lines instead of on vertical lines as in the aforesaid machines with rotary cutter bars. The severity of this thrust is fully understood by those practically acquainted with the use of mining machines, it having been in fact the main obstacle in the way of getting out coal by machinery, and the cause of more wear and breaking, than anything else.

Third. Use has been made of what are known as "pick" machines, that is, machines with cylinders, pistons, and pick cutters either attached directly to the piston, and reciprocated rectilinearly therewith, or carried by arms pivoted to a frame and having the pistons connected to the arms in such way that the picks can be rocked or vibrated, as is illustrated in the patent to Firth, No. 137,669; but to these machines with the vibrating pick cutters, there has been incident perhaps more trouble from the reactionary or side thrust, than any of the others.

Fourth. Use has been made of machines, each having a horizontal rotating saw or pair of saws connected together and revolving in the same direction. Some of these saws have projected laterally from the carriage and some have been thrust forward. When use is made of such saws the same difficulty from reactionary thrust is experienced; and besides this other disadvantages are introduced, among them being this, that the cutter carrier (the plate or central disk part of the saw) must be of very large diameter in order to produce a cut of sufficient depth and width, and as it is circular the half which projects rearward toward the bed is an impediment to providing a compact machine. A large number of cutters are required as the whole circle is utilized.

With those rotary saw machines which have the cutters in front and arranged to thrust directly forward, there is the additional disadvantage that in order to rotate them use must be made of chains rotating around vertical axes.

It has been proposed to overcome one of the above described difficulties in these sawing machines by having two oppositely rotating saws at the front of the carriage as is illustrated in the patent to Blyth, No. 20,836; but the other disadvantages above referred to are still present.

The object of the present invention is to provide a machine which shall preserve the features of advantages that have been present in one or another of the machines of the aforesaid types, and at the same time avoid the matters of objection that have been incident, some to one, and some to another.

I overcome the reactionary thrust of one set of cutters by means of the thrust of another set, and in order to have all operating practically simultaneously, I cause them to reciprocate instead of rotate, either vertically or horizontally, and by reciprocating I not only decrease the number and sizes of the parts and make the machine more compact, but transmit the necessary motion by fewer, simpler and more powerful mechanism, the extent or paths of movement being much reduced.

For some reasons I prefer to effect the reciprocation in circular or curvilinear lines, though some of the advantages can be retained even if the cutter moves in modified path.

In the drawings, I have shown a stationary frame, and a frame movable thereon, together with power-devices of a character which will illustrate a method of imparting the necessary movements to the parts more particularly pertaining to the present invention; but it will be understood that with respect to the supports, or frames, the engine, or motor, and the power transmitting devices, there can be considerable modification without departing from the invention.

As shown, A represents the side bars, or guide-bars, of a frame, which I shall call the "stationary frame," meaning thereby that portion of the mechanism which serves as a support and as an abutment for the movable parts. These side bars, or guide-bars of the stationary frame, may be secured together by girts, cross-bars, or other suitable devices, in order to give sufficient strength to the frame work. Upon them are mounted the sliding or movable bars B B. These, too may be joined and braced in any suitable way, as for instance, by girts, such as shown at $b\ b'$. Upon the front ends of these movable bars B are mounted the reciprocating cutters.

As shown, in Figs. 1 and 2, the cutter carrier C consists of a plate which may be regarded as being a part of a circle, that selected for illustration comprising substantially a semicircle. The cutter-carrier, C, is pivoted at $C'$, to a sliding support, which may be one of the sliding bars B, or an extension thereof; or to the latter may be secured one or more supporting parts B. As shown in the drawings, the cutter-carrier C lies between two such supports D, and is held by the pivot at $C'$ which may be a separate piece, or may be formed integrally with one of the parts. In the construction illustrated the supports D consist of plates, each having a curvilinear front edge. They are bolted to the sliding bar B, and project forward of the pivotal point somewhat, so as to guide, and firmly brace the oscillating cutter-carrier. If necessary, or preferred, anti-friction balls or rollers may be combined with the cutter-carrier to prevent any cramping or binding thereof. The supporting parts D D may be bolted or fastened together as at $D'$, slots in the carriers C, as at $C^3$, allowing the carrier to pass the bolts.

E E represent the cutters. These may be of any preferred character. In Figs. 1 and 2 they are shown as being of the nature of saw teeth, some being inclined in one direction, and others in the opposite. They may be mounted by inserting them into sockets in the peripheral face of the carrier, or they may be secured to the upper surface, or the lower, or both.

If a cutter-carrier of the size of that shown be used, it will be seen that the throw thereof may be comparatively short, it being only necessary that each tooth should travel over a path equal to, or a little greater than the distance between any two adjacent teeth; but the cutter-carrier can have a peripheral dimension considerably less than that shown in the drawings, in which case a throw somewhat greater will be required.

For reciprocating the cutter-carrier any suitable mechanical movement can be employed. In Figs. 1 and 3 toggle links are shown connected pivota'ly to the cutter-carriers and also to a pitman G, which at the rear end is connected with a crank or other eccentrically moving device as shown at H. In Fig. 3 the crank is carried by a wheel $H'$ mounted on a vertical shaft $H^2$, which can be supported in any suitable way. By a construction such as shown, both the cutter carriers can be reciprocated in opposite directions; but as above said any well known or suitable mechanism can be interposed between the power devices and the cutter carriers. These devices may be operated by hand, or by engines and power transmitting devices of any preferred character.

I prefer to have two of the cutter-carriers in each machine and arrange them so, that they oscillate oppositely to each other. Under ordinary circumstances the total length of the cut from outside to outside is thirty-six inches, but this may be increased or diminished, as is required.

In Figs. 4 and 5 I have shown another form of the machine in which use is made of teeth of a modified character, and also of a somewhat different operating mechanism. The teeth E in this case are more nearly similar to those used in the machines where a scraping cut is attained; that is to say, the operative edges of the teeth are more nearly perpendicular to the plane of oscillation than they are in the construction shown in Fig. 1. In using a machine of the character shown in Fig. 4 the forward feed should be so related to the cutting action that the teeth will not be crowded against the breast of coal during their return movement. In this case the operating device consists of an eccentric H connected with the cutter-carriers by pitman G and toggles F. The cutter-carriers, instead of being plates, may be skeleton frames, each comprising more or less of a peripheral rim and radial arms, together with a suitable hub; or radial arms, simply, may be depended upon to attain some of the advantages. In this way the amount of metal can be reduced, and, at the same time, the parts may be made more open so as to prevent their being loaded with cuttings, and thereby clogged. So, too, the braces or holders D may be made skeleton like, instead of continuous plates; and, in fact, these braces or supports can be dispensed with, when the circumstances are such that there is no severe strain experienced by the cutter-carriers.

It will be seen that there is no "side thrust" in a machine of this character, that is to say, no tendency to force the frame work toward one side or the other, inasmuch as the side thrust caused by one of the sets of cutters is neutralized by the opposite thrust of the other set, the two carriers moving simultaneously and in opposite directions. So far as concerns this matter of lateral balancing, it will be seen that it is not necessary that the two cutter carriers should be in exactly the same horizontal plane. It will be also seen that even where there is but one such curvilinearly reciprocating cutter-carrier there are advantages in operation over those machines in which use is made of rectilinearly reciprocating cutter bars, inasmuch as there is no resistance or reaction from the coal at the end of the throw; that is to say the balancing, is effected by having two oppositely reciprocating cutter carriers, but whether one or two carriers be used there is an advantage under many circumstances in having oscillating movement thereof, inasmuch as I can thereby dispense with drills, or hole forming mechanism, along the sides for opening an aperture, into which the reciprocating cutters can move at each end of their throw.

The cutters can be arranged to produce a kerf of any required depth. In coal mining a kerf three inches deep will be sufficient, and the parts which carry and engage with the cutter-carriers should be so arranged as to lie within the kerf produced by the cutters.

I know that it has been heretofore proposed to use oscillating cutters of various sorts when arranged to project laterally from a carriage or car moving parallel to the face of the coal which is operated upon. In such case the cutters do not gradually advance farther and farther in on a line transverse to the face of the coal but are carried along on lines parallel to the face. It is well known that there are incident to such machines difficulties which have proved them to be practically valueless. The strain which is put upon them by reason of the cutter carrier projecting laterally is such as to render it impossible to hold the machines to their work. I avoid these difficulties by arranging the cutter carrier so that it advances directly into the coal, the bed or stationary frame being available as a direct abutment for the reactionary thrust.

I am aware of the fact that oscillating cutters of various sorts have been heretofore known for channeling and dressing stone, and I do not claim such devices as my invention; but I believe myself to be the first to have arranged parts of substantially the construction shown in such way that they can be made available for undercutting coal and other similar material.

In one of the said earlier stone dressing machines, within my knowledge, use was made of a segmental plate for a cutter carrier, it having one or more cutters secured to its periphery; but in such machines so far as I know no use has been made of devices similar to mine, and in fact there was no necessity for them. In the stone dressing machines the cutters were not required to enter the material so deep as to necessitate the entrance also of the parts, or any of them which carry the cutter. To attain my purposes it is necessary that the cutter should be so constructed, and arranged in such relation to the other parts that a wide kerf should be produced into which the cutter plates and the parts of the sliding carriage can pass for a comparatively long distance.

What I claim is—

In a mining machine, the combination of the bed frame adapted to be made stationary and lie outside of the kerf, the carriage moving forward and back on said bed frame, two oppositely, simultaneously and laterally reciprocating cutter carriers mounted on the front end of the carriage and adapted to be constantly pressed forward while cutting and to be advanced into a kerf away from the bed, and cutters secured to said carriers and arranged to cut a kerf to receive both the laterally reciprocating carriers and the advancing carriage, whereby the cutter carriers can be carried under the coal beyond their own width and while thereunder will laterally balance each other while moving to and fro over limited distances relatively to their guides substantially as set forth.

In testimony whereof I affix my signature in presence of two witnesses.

HENRY B. DIERDORFF.

Witnesses:
KATE E. WILLIAMS,
A. H. FRITCHEY.